United States Patent [19]

Tagawa et al.

[11] 4,435,024
[45] Mar. 6, 1984

[54] BEARING CAGES FOR SUPPORTING AND RETAINING ROLLER ELEMENTS IN CYLINDRICAL ROLLER BEARINGS

[75] Inventors: Kenichi Tagawa; Takao Iguchi, both of Fujisawa, Japan

[73] Assignee: Nippon Seiko Kabushiki Kaisha, Tokyo, Japan

[21] Appl. No.: 392,539

[22] Filed: Jun. 28, 1982

[30] Foreign Application Priority Data

Jul. 24, 1981 [JP] Japan ................................. 56-116141

[51] Int. Cl.³ .............................................. F16C 33/46
[52] U.S. Cl. ................................................... 308/217
[58] Field of Search ............... 308/201, 217, 218, 235, 308/207 R

[56] References Cited

U.S. PATENT DOCUMENTS 1,887,176 11/1932 Young ................................... 308/217
1,940,124 12/1933 Gibbons ............................... 308/217
3,495,889 2/1970 Nisbet ................................ 308/217 X

FOREIGN PATENT DOCUMENTS 1215466 12/1970 United Kingdom .

Primary Examiner—Stuart S. Levy
Assistant Examiner—David Werner
Attorney, Agent, or Firm—Basile, Weintraub & Hanlon

[57] ABSTRACT

A cage consists of a pressed annular metal cage member (6) and one or two molded plastic roller retaining member(s) (10). Each roller retaining member (10) includes a cylindrical part having pockets for receiving a bearing roller (3) and an annular flange or flanges (8) formed either on only one axial end or on both axial ends of the cylindrical part. Each roller retaining member comprises an annular ring portion (11) having an annular side face engaged by an annular outside face of the flange (8) of the case member, (6), and an annular fitting face 17 to be lightly engaged with or spaced apart by a slight gap from either a radially inner face or outer face of the flange. Teeth (12) transversely project between the rollers (3) for preventing slipping out of any bearing roller. A plurality of lips for coupling and locking the roller retaining member to the flange of cage member (6) are, also, formed on the ring portion.

9 Claims, 7 Drawing Figures

BEARING CAGES FOR SUPPORTING AND RETAINING ROLLER ELEMENTS IN CYLINDRICAL ROLLER BEARINGS

BACKGROUND OF THE INVENTION

1. Field of the Invention

This invention relates to cages for cylindrical roller bearings and, more particularly, to improved cages provided with a plurality of roller retaining devices fabricated of plastic material which are movable in circumferential direction, thereby enabling ready fabrication and assembly of the cages into roller bearings.

2. Description of the Prior Art

Generally, pressed, integral cages for roller bearings of the type in which either one of the bearing rings are separable, have encountered problems of limited dimensional accuracy in molding the teeth and lips projecting between adjacent rollers. Also, there is limited dimensional accuracy when bending and crimping the teeth during sub-assembly. Because of these dimensional inaccuracies, a tooth may excessively contact the roller or rollers, thereby impairing smooth rotation. Contrariwise, the extent of contact with related roller(s) by a tooth may be so insufficient as to result in much sinkage of the roller, thereby making assembly of a mating bearing ring very difficult.

In view of these drawbacks, various bearing cages of the so-called "separated" type have been developed, in which a bearing cage comprises a cage member and a discrete roller retaining device. An example of such a cage is shown in Japanese Utility Model Publication No. 7904/62, in which an auxiliary ring, namely, a roller retainer formed with a retainer groove having a width slightly smaller than the diameter of the pockets defined in a cage member, is inserted in the cage member. Another "separated" bearing cage is shown in Japanese Patent Publication No. 9608/63 in which a plastic retaining piece or pieces are heat bonded on both a radial inner face and an outer face or, alternatively, on either one of the above-mentioned two faces such that the retaining pieces of lips extend through a marginal part of the openings formed in the cage member.

The first "separate" type bearing cage discussed above still suffers from certain drawbacks. For example, since in its assembly a flange of the auxiliary ring is engaged with the axial end face or faces and, then, a post or posts, formed between the retaining groove, are press fitted to either the radial inner side or the outer side of the cage member, positioning of related elements is very difficult. In addition, since the post or posts in the retaining groove are supported against the flange, as a mere one-side support, when either an inner ring or an outer ring is not coupled during its assembly, the post is liable to be deformed by the weight of rollers. Even after the assembly is completed, the auxiliary ring may slip out from the cage member, during running, due to vibration or some other cause.

The second type of roller retaining device discussed above also has disadvantages. Because the plastic roller retaining member is heat bonded to the cage member, a great degree of skill is required in circumferentially positioning the teeth or lips exactly to each retaining hole or opening.

In addition to the aforesaid devices, integrally molded plastic cages have been used, but they are still unsatisfactory with regard to both strength and accuracy for high load appliances.

It is, also noteworthy that in both of the "separate" type of cages mentioned above, the roller retaining device or member is not allowed to take any relative displacement with respect to the cage member. Because of this, it has been found that some part of the cage restrains the rollers and is liable to impair bearing characteristics.

So far as the present inventors know, it is believed that the above-mentioned publications are the most relevant to the present invention. Attention is directed, also, to British Patent Specification No. 1215466. However, it is unclear whether the British patent teaches a construction allowing displacement of the roller retaining device relative to the cage member, which is deemed to have some drawbacks, particularly, similar to that of the first prior art device discussed above.

Accordingly, an object of the present invention is to provide a "separate" type bearing cage of high strength and high accuracy for a cylindrical roller bearing comprising a pressed or machined metal cage member and a roller retaining member which is fabricated from a plastic material.

Another object of the present invention is to provide a bearing cage, of various modifications, for cylindrical roller bearings which can be readily assembled without requiring any particular accuracy in the circumferential positioning between the cage member and the roller retaining device or member.

A further object of the invention is to provide bearing cages with various modifications which can be manufactured at low cost by virtue of the shaping of component parts by simplified steps. A still further object of the present invention is to provide cages especially suitable for cylindrical roller bearings capable of withstanding high service loads.

SUMMARY OF THE INVENTION

According to the present invention, each cage for a cylindrical roller bearing comprises a pressed metal cage member and a single or a pair of molded plastic roller retaining members. The cage member includes an annular cylindrical portion having a plurality of pockets and a flange or flanges formed on at least one axial end of the cylindrical portion.

Each roller retaining member includes an annular ring portion having an annular side face which contacts the axially outer face of the flange of the cage member and a circumferential fitting face which slightly contacts with or is spaced apart, with a narrow gap, from either a radial inner end face or outer end face of the flange of the cage member. Each roller retaining member, further, includes a plurality of teeth extending axially inward from the annular ring portion and are disposed between cylindrical rollers for preventing sinkage of the rollers. Each roller retaining member has a plurality of lips for locking the roller retaining member to the flange of the cage member. Assembly of the cage can be done by snapping the roller retaining member into the cage member by pushing the roller retaining member axially inwardly from outside the flange.

Since the cage, according to the present invention, comprises a metal cage member and a plastic roller retaining member or device which are coupled together, while maintaining a suitable gap or clearance therebetween, no particular accurate positioning of the roller retaining device is required in making a forced fitting, thereby enabling ready assembly.

Once the cage member and the roller retaining member have been incorporated into an assembled bearing, the annular circumferential face of the ring portion and the lips of the roller retaining member engage each one of the axial side faces of the flange, respectively, for firmly gripping the flange from both sides. This enables the roller retaining member to assume a correct configuration and position with respect to the cage member. Accordingly, any undesirable displacement or deflection of the roller retaining member caused by the weight of cylindrical rollers and that of the retaining member inself, which could disturb smooth rotation of the rollers, or any other problems, such as deformation of the teeth and or lips, can be suppressed. By such prevention, concomitantly, noise generation in running can be suppressed.

In addition, since radial displacement of the rollers can be suppressed to a minimum level, insertion of a bearing ring, to be assembled later, can be done very readily. Also, the fear of damaging bearing rollers during assembly can also be eliminated. Likewise, in use, as the bearing rotates, since the roller retaining member has been prevented from axial displacement, there is no fear of it slipping out of the retaining member. It is to be particularly noted, that the roller retaining member is allowed to have some degree of circumferential movement, as if floatingly supported, so even when any roller or rollers contact the teeth or projections of the roller retaining member, the projection is allowed to move to relieve the given impact force. Accordingly, there is no fear of impaired rotation, damage, or deformation of the teeth.

In addition, where the cage members are made by press forming, they can be made by simplified work steps together with high dimensional accuracy, very light weight and with fairly low cost as high precision bearing cages suitable for cylindrical roller bearings which are serviceable for high load applications.

BRIEF DESCRIPTION OF THE DRAWING

For a more complete understanding of the present invention, reference is made to the following detailed description and the accompanying drawing. In the drawing, like reference, characters refer to like parts throughout the several views, in which.

DETAILED DESCRIPTION OF THE PREFERRED EMBODIMENTS

Figure 1:
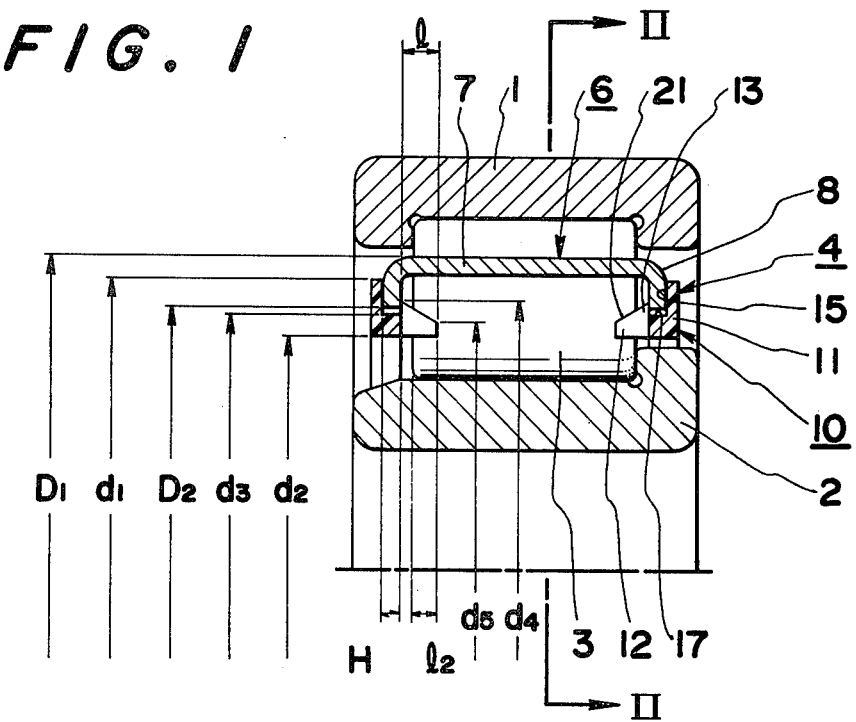
FIG. 1 is a cross-sectional view showing a first embodiment of the invention.
Figure 2:
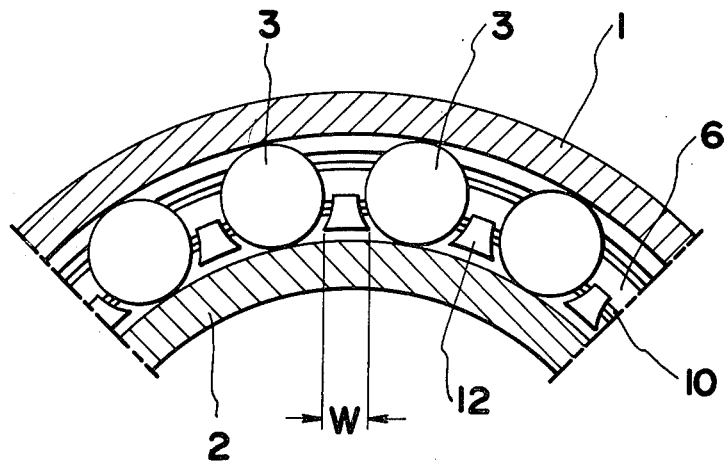
FIG. 2 is partial cross-sectional view taken along line II—II of FIG. 1.

Referring now to the drawing and, in particular, to FIGS. 1 and 2, there is shown a first embodiment of the present invention. A bearing assembly includes an outer ring 1 having flanges provided on both axial ends of its race way and an inner ring 2 having a flange on one axial end of the race way. The assembly, also, includes a cylindrical roller 3 and the cage 4 of the present invention.

The cage 4 comprises a cage member 6 made of a pressed metal sheet and a roller retaining device 10 of molded synthetic resinous material, i.e., a plastic.

The cage member 6 has a radial bend at both axial end portions thereof and is formed by bending a metal hollow cylinder radially inward. The bends define a pair of annular flanges 8. Thus, the cage member 6, as formed, has a U-shaped cross section with a widened base and two short legs. The cylindrical portion 7 of the cage member 6 has a plurality of openings or pockets (not shown) formed therein which are spaced at a predetermined pitch. The pockets are separated by a plurality of posts (not shown) for supporting and guiding cylindrical rollers.

Figure 3:
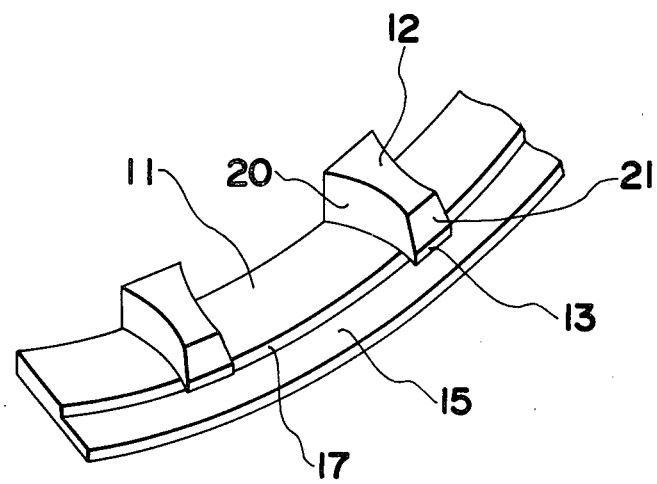
FIG. 3 is a perspective view showing a part of the roller retaining device of the invention.

The roller retaining device 10 comprises a circular ring portion 11, a plurality of teeth 12 projecting from axially inside the face of the ring portion 11 to prevent a cylindrical roller 3 received between two adjacent teeth 12 from sinkage or slipping down therefrom and a lip 13 formed on each tooth 12, integrally with and projecting radially outward from the teeth 12 associated therewith (FIG. 3).

The ring portion 11 of the device 10 has, on its annular inside face 15 which contacts each axial outer face of the flanges 8, an annular stepped portion which defins an annular fitting face 17. The fitting face 17 engages the radial inside edge faces of the flanges 8. In this embodiment, the outside diameter d1 of the ring portion 11 is slightly smaller than the outside diameter D1 of the cylindrical portion 7 of the cage member 6, while the inside diameter d2 of the ring portion 11 is smaller than the pitch circle of the cylindrical roller 3 so that the annular inside face 15 can engage almost the entire outside surface of the flange 8 of the cage member 6. The outside diameter d3 at the annular fitting surface 17 of the roller retaining device 10 is slightly smaller than the inside diameter D2 of the flanged portion 8 of the cage member 6 and the width or height H of the stepped fitting surface 17 is almost equal to the wall thickness of the flanged portion 8. Accordingly, when the roller retaining device 10 is coupled in position to the flange 8 through the lips 13, there remains such a small gap between the annular fitting surface 17 and the radial inside edge face of the flanged portion to permit some circumferential movement of the roller retaining device 10 with respect to the cage member 6.

As shown in the drawing, the two opposing side faces of each tooth or projection 12 are formed such that each constitutes a part of a concave circular cylindrical surface 20. The surfaces 20 coincide with the curvature of the cylindrical rollers. The width W of the radial inside end face of the teeth 12 (FIG. 2) is larger than the space between two adjacent rollers 3 along the pitch circle of the rollers, while the axial length of each tooth 12 is larger than the sum of (1) the length of the space between (a) the associated axial end of the cylindrical roller 3, when assembled, and (b) the annular face 15 of the ring portion 11 of the roller retaining device 10 and the (2) the length 12 necessary for engagement with the rollers 3 to permit axial movement of the rollers.

As shown in FIG. 3, the teeth 12 are provided on the axially inside face of the ring portion 11 and have a predetermined pitch. The radial outer tip end of the teeth 12 are each formed with a tapered face 21 which is inclined such that it extends radially outward toward the flange and the radially outer end of the tapered face 21 protrudes radially outward beyond the fitting surface 17 to thereby define the lip or pawl 13. The outside diameter d4 of the lip 13, at the outermost extremity (radially outermost end of the tapered face 21), is larger than the inside diameter D2 of the flange 8 of the cage member 6; while the diameter d5 of the lip 13 at the rearward end (radially innermost end of the tapered face 21) is made smaller than the inside diameter D2 of the flange 8.

When it is necessary to incorporate the cage hereof into a bearing, the cage member 6 is inserted into the outer ring 1. Then a necessary number of rollers 3 are inserted in the pockets of the cage member 6. Next, a roller retaining device 10 is axially inserted into the cage member 6 from the outside, with the teeth 12 being directed toward the interior of the cage member. During insertion, the tapered faces 21 on the teeth 12 act as guide faces and the lips 13 are elastically deformed under forced contact with the inside face of the flange 8 of the cage member 6 and, then, restored to their original configuration. Thus, the back face of each lip 13 and annular inside face 15 of the ring portion 11, respectively, contact the axial inside face and outside face of the flange 8 of the cage member 6. Hence, the circumferential fitting face 17 of the ring portion 11 is positioned to maintain a small clearance between the radially inside end face of the flange 8. Since the roller retaining device or member 10 assembled in this manner is circumferentially movable with respect to the cage member 6, no particular strict positioning work is required with respect to the cage member 6 during the snapping in operation. Moreover, because the diameter d5 of each tooth 12 at the radially innermost end of the tapered face 21 is smaller than the inside diameter D2 of the flange 8 of the cage member 6, the snapping-in operation can be made very easily. Also, when assembly has been finished, the diameter d4 of each lip 13, at the radially outermost part end, becomes larger than the inside diameter D2 of the flange 8 of the cage member 6, so that the roller retaining member 10 will never slip out through the flange 8. In addition, since there remains a suitable amount of clearance between the fitting face 17 of the ring portion 11 and the radial inside face of the flange 8, the roller retaining member 10 will not seize the flange 8 of the cage, nor restrain circumferential movement of the retaining member, even if the roller retaining members expand due to a temperature rise during running.

When an outer ring 1 and bearing rollers 3 have been assembled by using the cage 4 of this invention, each tooth 12 of the roller retaining member 10 engages two adjacent rollers at the intermediate position between them, so the rollers will never displace or drop out by handling. Any yet, ring the portion 11 of the roller retaining device or member 10 supports the flange 8 at the annular peripheral face 15 since it has a sufficiently large surface area. In this manner, the ring portion is able to support the weight of the cylindrical rollers which are supported by the teeth 12. Therefore, deformation of the teeth 12 is very rare, even if heavy weight rollers are used.

The flanges 8 of the cage member 6 of the first embodiment are formed as circumferentially continuous ones at both axial ends of the cylindrical part 7 and the lips 13 of the roller retaining members 10 are formed on each and all of the teeth 12. However, it is not necessary to be so formed. Also, a plurality of discontinuously spaced apart flanges 8 can be used herein. Similarly, lips 13 may be formed only on some of the teeth 12 at suitable locations. Accordingly, the manner of coupling the roller retaining member 10 to the cage member 6 can be made, in addition to the way where all teeth are coupled or locked to the continuously formed flange, either by coupling the lips formed on a part of the teeth 12 to the continuously formed flange, or by locking all or a part of the lips to the discontinuously formed flanges.

Figure 4:
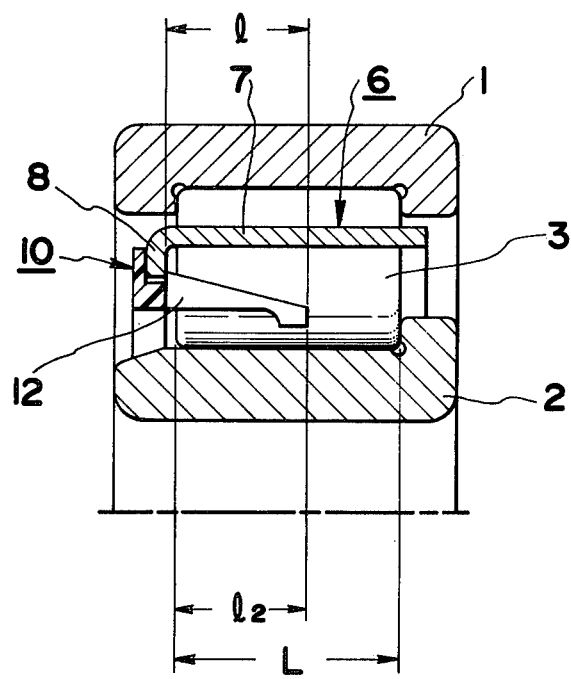
FIG. 4 is a cross-sectional view showing a second embodiment of the invention.
Figure 3:
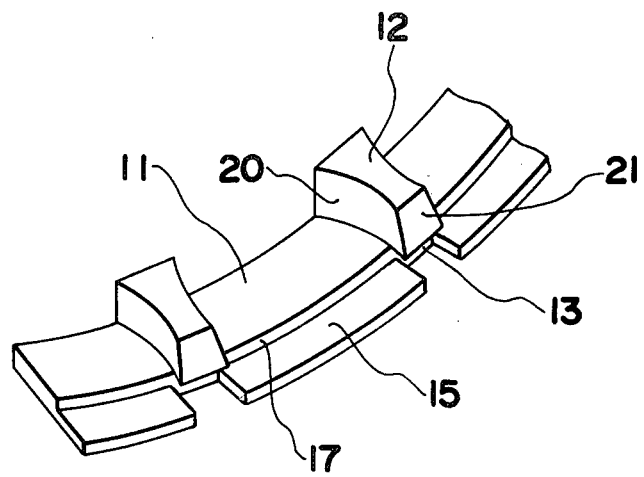
Figure 4:
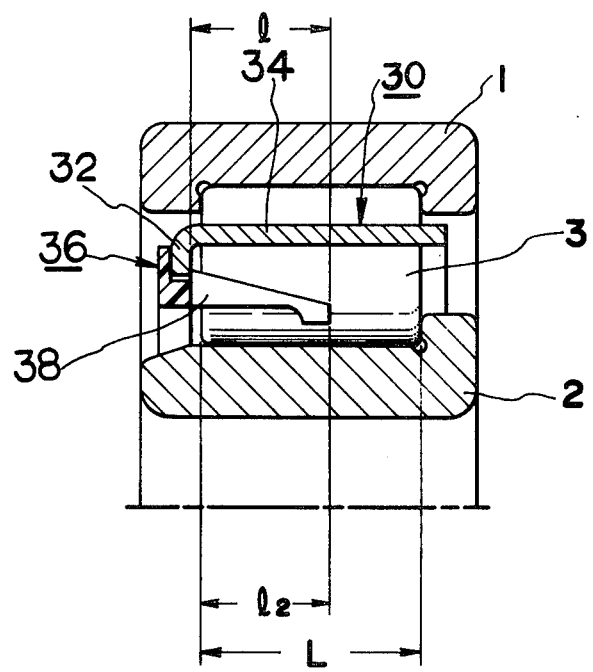

FIG. 4 shows a second embodiment of the invention in which a cage member 30 has a flange 32 formed on only one axial end of its cylindrical part 34 thus forming an L-shaped cross-section. A roller retaining device 36 to be coupled to the cage member 30 of this kind has teeth or projections 38, the axial length of which are made longer than those shown in FIG. 1 and, also, have a length of contact with the cylindrical rollers 3 greater than one half the axial length L of the rollers. Since the construction and relative dimensions of the components, other than the teeth 38, with respect to the flange 32 of the cage member 30 are the same as shown in FIG. 1, detailed explanation will not be given again.

Figure 5:
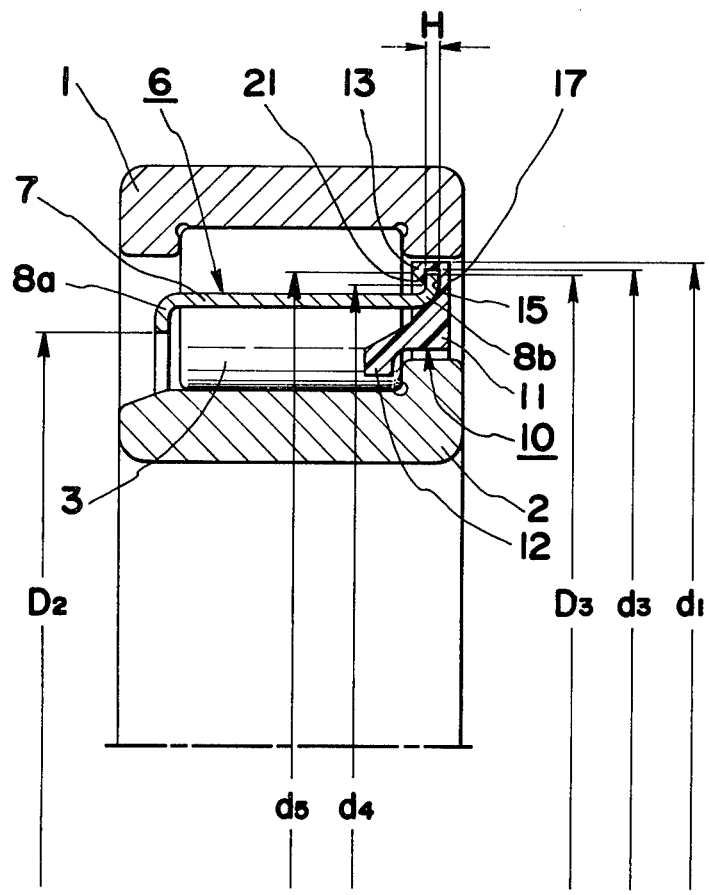
FIG. 5 is a cross-sectional view showing a third embodiment of the invention.
Figure 5:
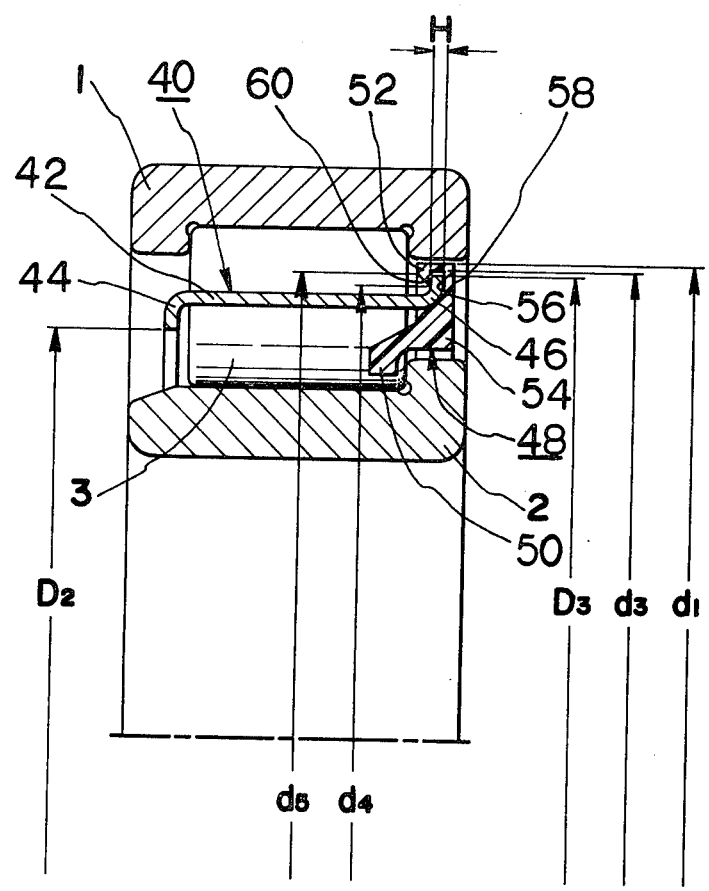

FIG. 5 depicts a third embodiment of this invention in which a cage member 40 has, on one axial end of its cylindrical portion 42, a flange 44 bent radially inward and on the other axial end a flange 46 bent radially outward in a Z-shaped cross-section.

An annular roller retaining member 48 is coupled to the outwardly bent flange 46. The roller retaining member 48 has teeth 50 directed axially inward for preventing a cylindrical roller(s) 3 from slipping down, similar to that shown in FIG. 1. However, each of the lips 52 is aligned with located radially of each tooth 50 of the ring portion 54 such that the ring portion 54, itself, is held tight to the outwardly bent flange 46.

In this embodiment, the outside diameter d1 of the ring portion 54 is larger than that of the outside diameter D3 of the flange 46 to define a radial outer margin. An annular side face 56 is adapted to be contacted with the axially outer face of the outside flange 46. Also, a fitting surface 58 is formed on the ring portion 59 and is intended to contact the radially outer end face of the flange 46, as shown. The inside diameter d3 of the fitting surface 58 is made larger than the outside diameter D3 of the flange 46 and its width H is almost the same as the wall thickness of the flange 46.

Teeth are formed to extend axially inward from the radial outer end of the ring portion 54. Each projection has a radial inner tapered face 60 which inclines radially outward and axially inward from the ring portion 54. The radial inner tip end of the face 60 is formed to define a lip 52 extending radially inward below the fitting face 58. The inside diameter d4 of the lip 52 at the radially innermost rim of the tapered face 60 is smaller than the outside diameter D3 of the flange 46 of the cage member 40 and the diameter d5 of the lip 52 at the tip end (radially outermost end of the tapered face 60) is made larger than the outside diameter D3 of the outer flange 46.

Insertion of the cage of the above-mentioned construction in assembling a bearing is performed in a manner similar to that done in the embodiment shown by FIG. 1.

The position and spacing of the lips of the roller retaining member of this embodiment are most suitably selected so as to correspond to each of the teeth or projections. However, they may be positioned integrally with only some of the teeth with appropriate intervals. Similarly, the outside flange 46 of the cage member can be formed at the circumferentially intermediate outside surface of the cylindrical portion 42 of the cage member 40.

When a roller retaining device is to be locked to the inwardly bent flange 44 of the cage member 40, the roller retaining device used in the embodiment of FIGS. 1 and 2 can be used.

Figure 6:
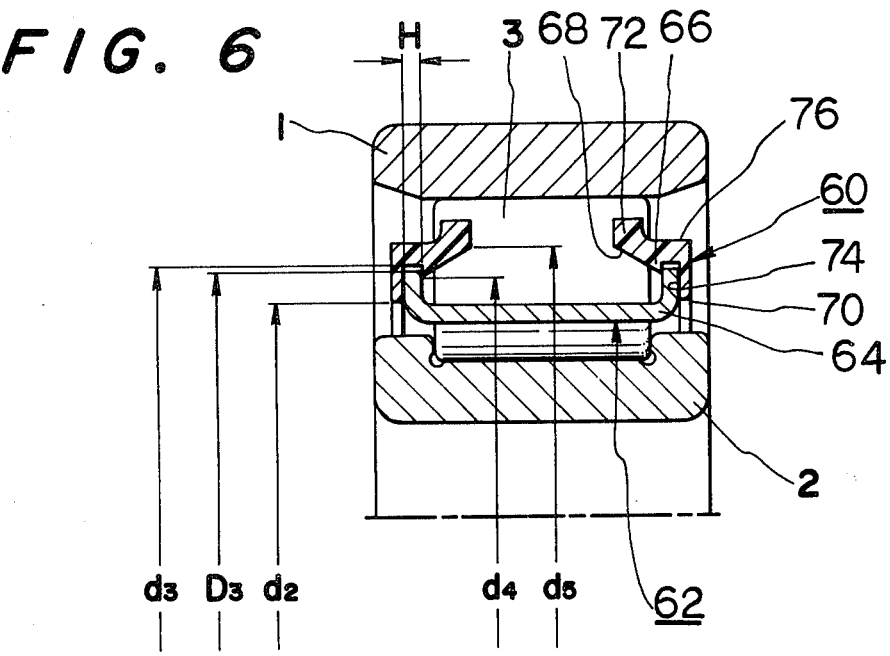
FIG. 6 is a cross-sectional view showing a fourth embodiment of the invention.
Figure 7:
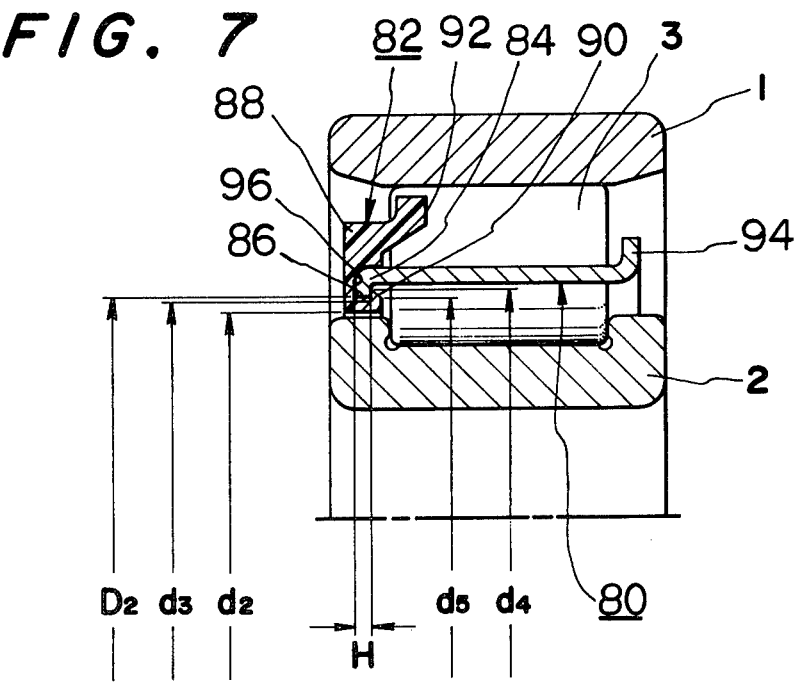
FIG. 7 is a cross-sectional view showing a fifth embodiment of the invention.
Figure 6:
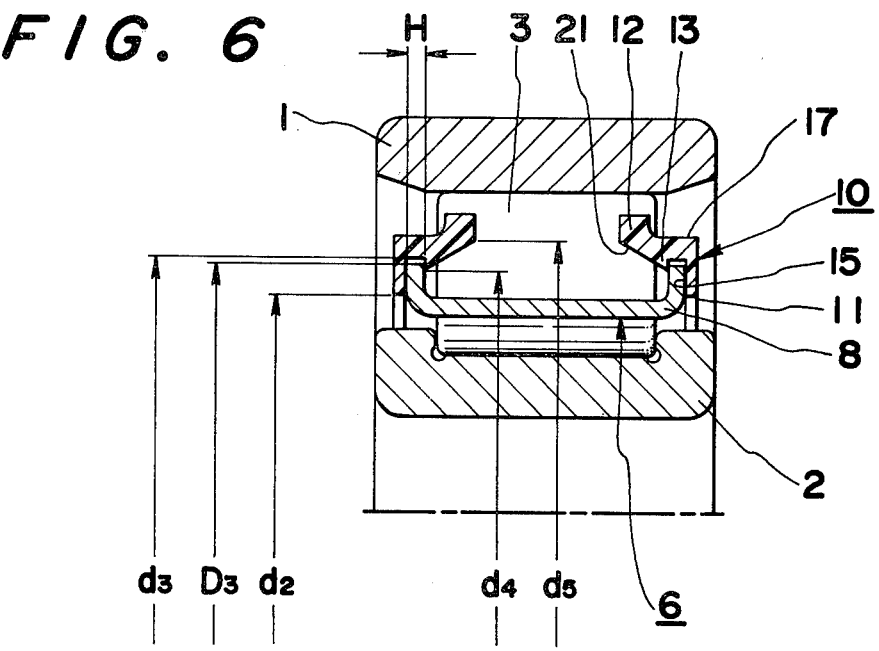
Figure 7:
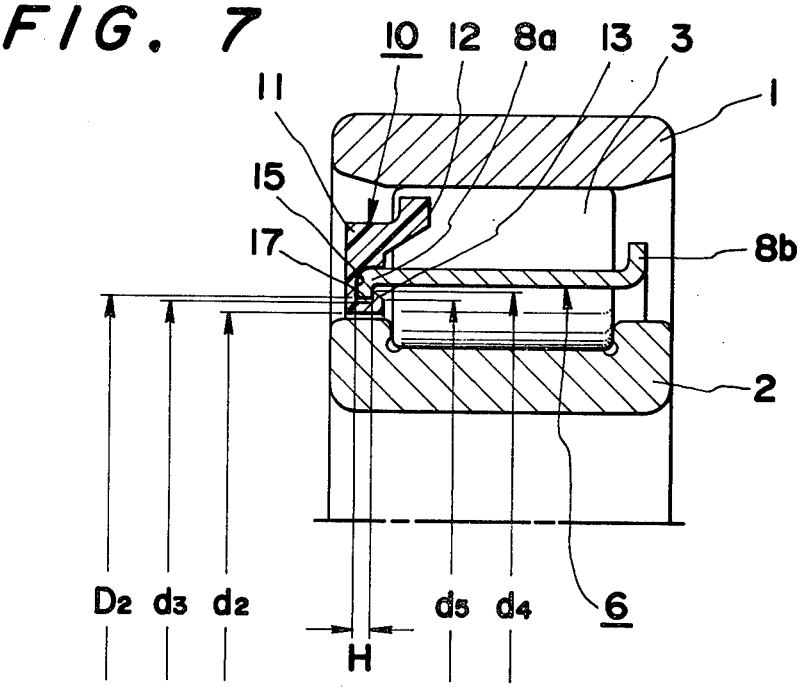

FIGS. 6 and 7 show, respectively, a fourth and fifth embodiment of the present invention, wherein the inner ring and the cylindrical rollers are functionally assembled by an annular roller retaining device.

In both figures, a bearing assembly includes an outer ring 1 having no flange on both axial ends axially outside the race way, an inner ring 2 having flanges on each axial end outside the race way and cylindrical roller(s) 3.

FIG. 6 shows a roller retaining device 60 applied to a cage member 62 having short leg "U" section. Both the cage member 62 and the roller retaining device 60 have their components placed symmetrically with respect to the central axis normal to the axis of rotation. In this embodiment the following relationship is satisfied between the outside diameter D3 of the flanges 64 of the roller retaining member at the radially innermost end of lips 66 and the diameter d5 of the roller retaining device at the radially outermost end of the tapered face 68 of the roller retaining device 60;

$$d4 < D3 < d5 \text{ and } d3 > D3$$

When a cage member having an L-shaped cross-section is used in this embodiment, a roller retaining device 70 having the shape and position approximately symmetrical to that shown in FIG. 1 will be used.

FIG. 7 depicts an embodiment using a cage member having a Z-shaped cross-section. According to the embodiment, the cage member 80 and the roller retaining device 82 are constructed and coupled in a manner both in axial and radial relationship reverse from that shown in FIG. 5. As a result of this, the following relationship must be satisfied regarding the inside diameter D2 of the inwardly bent flange 84 of the cage member 80, the diameter d3 of the fitting face 86 of a ring portion 88 of a cage retaining member 82, the diameter d4 of the lip at its redially outermost end, and the diameter d5 of the lip at the radially innermost end of the tapered face of the lip:

$$d4 > D2 > d5 \text{ and } d3 < D2$$

When assembling a cage shown in either FIG. 6 or FIG. 7 into a bearing, the cage member is first inserted around the inner ring 2.

Next, the rollers 3 are placed in each of their respective pockets formed in the cage member. Then, a roller retaining member is inserted axially inwardly on the cage member, from outside, by axially pushing the roller retaining member with its teeth, toward the interior of the bearing. In this manner, the lips can be interlocked the flange at its axial inside face.

In all of the embodiments shown heretofore, the inclined face of the lips of the roller retaining device has been shown being tapered. However, it is not necessary to be so-formed, but rather, can be convex, concave or any other configuration, so long as it functions with less resistance during forced insertion. Similarly, the surface extending from the teeth or from the axial tip end of the roller retaining device to the flange of the cage member need not necessarily be an inclined surface. Also, in all the embodiments shown above, the ring portion of the roller retaining device are shown as being formed circumferentially continuous. However, such ring portions, particularly those shown in FIGS. 1, 4 and 6, can be formed discontinuously or partly discontinuously by those portions thereof corresponding to the teeth and or lips. This is achieved by cutting out the portions as windows or cutting out the outer marginal portions. Such modified designs will obviate deformation or damage during their molding work and enable molding with high accuracy, because the molded roller retaining members can be readily stripped off from the mold by a mere axial drawing or pulling action. The roller retaining member or device shown in FIGS. 5 and 7 also can be made with discontinuously formed ring portions, as explained in the aforesaid modification.

As noted hereinabove, and as is to be appreciated from the preceding description, since a cage according to the present invention comprises a metal cage member and a plastic roller retaining member or device which are coupled together, while maintaining a suitable gap or clearance therebetween, no particular accurate positioning of the roller retaining device is required in making a forced fitting, thereby enabling ready assembly.

Once the cage member and the roller retaining member have been incorporated into an assembled bearing, the annular circumferential face of the ring portion and the lips of the roller retaining member engage each one of the axial side faces of the flange, respectively, for firmly gripping the flange from both sides. This enables the roller retaining member to assume a correct configuration and position with respect to the cage member, thus avoiding undesirable displacement or deflection of the roller retaining member caused by the weight of the rollers and that of the retaining member itself. Likewise, other problems, such as tooth or lip deformation, are prevented.

In addition, since radial displacement of the rollers can be suppressed to a minimum level, insertion of a bearing ring, to be assembled later, can be done very readily. Also, the fear of damaging the bearing rollers during assembly can also be eliminated.

In addition, where the cage members are made by press forming, they can be made by simplified work steps together with high dimensional accuracy, very light weight and with fairly low cost at high precision bearing cages suitable for cylindrical roller bearings which are serviceable for high load applications.

Having, thus, described the invention, what is claimed is:

1. A cage assembly for retaining and supporting cylindrical, bearing rollers comprising:
   (a) an annular cage member, the cage member including:
      (1) a straight cylindrical portion having a plurality of pockets formed therein for receiving a plurality of bearing rollers,
      (2) at least one flange provided on one axial end of the cylindrical portion, the flange having an axial outer side face, a radial inside edge face and a radial outer edge,
   (b) at least one plastic retaining member, the roller retaining member comprising:

(1) an annular ring portion having an annular side face adapted to be contacted by the axial outer side face of the flange, (2) an annular fitting face contiguous with the annular side face, (3) a plurality of teeth having a radial outer face and a radial inner face, the teeth extending axially inwardly from the ring portion and positioned between adjacent rollers for preventing slipping down or out of any bearing roller, and (4) a plurality of lips integrally formed with the ring portion for locking the roller retaining member to the flange, each of the teeth having a face extending axially inward from a radial outer tip end and inclining radially inward such that the roller retaining member is coupled to the cage member by pushing the retaining member axially inward from outside the flange of cage member.

2. The cage assembly for retaining and supporting cylindrical bearing rollers as claimed in claim 1, wherein:
one of the lips is integrally formed on each tooth.

3. The cage assembly for retaining and supporting cylindrical bearing rollers as claimed in claim 2, wherein
(a) each lip is formed as a tapered face radially inclined with respect to the flange of said cage member on a radial end of each tooth, and
(b) the diameter d4 of said lip of the radially outermost end of with respect to the radial inside diameter D2 of the radial outer edge of said flange of said cage member and the diameter d5 of the radially inner end of the tapered face is in a relationship represented by $d4 \geq D2 \geq d5$.

4. The cage for retaining and supporting cylindrical bearing rollers as claimed in claim 2 or 3, wherein said roller retaining member has lips formed on at least some of the teeth.

5. The cage for retaining and supporting cylindrical bearing rollers as claimed in claim 1 wherein: the annular side face of said ring portion of said roller retaining member is formed with a discontinuity at portions corresponding to the position of the teeth or lips.

6. The cage for retaining and supporting cylindrical bearing rollers as claimed in claim 1, wherein the roller retaining member further comprises:
(a) the teeth being at either a radially outer side or inner side with respect to said ring portion and having an inclined inner face inclining axially outwardly and radially either inward or outward toward the flange of said cage member; and
(b) the plurality of lips each being integrally formed at the axially outermost end of the inclined face of the teeth so as to be snugly fitted to the inner side wall of said flange.

7. The cage for retaining and supporting cylindrical bearing rollers as claimed in claim 6, wherein: the inclined face of the teeth include the lip being formed as a tapered face, extending axially inwardly from the axial inside face of the ring portion and being radially inclined in relation to form of said flange, each lip being formed on the radial end of the tapered face and, further, wherein the diameter d4 at the tip end of the lip, the diameter d5 at the rear end of the lip, and the outside diameter D3 of the outer flange are, in relation to each other, defined as $d4 < D3 < d5$.

8. The cage for retaining and supporting cylindrical roller bearings as claimed in claim 6, or 7 wherein the ring portion of the roller retaining member has a plurality of integrally formed lips formed on at least some of the teeth.

9. The cage for retaining and supporting cylindrical bearing rollers as claimed in claim 6, wherein: the inclined face of the teeth include the lip being formed as a tapered face, extending axially inwardly from the axial inside face of the ring portion and being radially inclined in relation to the form of said flange, each lip being formed on the radial end of the tapered face and further, wherein the diameter d4 at the tip end of the lip, the diameter d5 at the rear end of the lip, and the outside diameter D3 of the outer flange and the inside diameter D2 of the inner flange, in relation to each other defined as $d4 > D2 > d5$.

* * * * *